(12) United States Patent
Fok et al.

(10) Patent No.: US 8,923,308 B2
(45) Date of Patent: Dec. 30, 2014

(54) NETWORK ACCESS CONTROL

(75) Inventors: Frederick Ah Chuen Fok, Berkshire (GB); Alina Ciotta, Berkshire (GB)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 67 days.

(21) Appl. No.: 12/735,683

(22) PCT Filed: Mar. 3, 2009

(86) PCT No.: PCT/JP2009/054371
§ 371 (c)(1),
(2), (4) Date: Aug. 6, 2010

(87) PCT Pub. No.: WO2009/113468
PCT Pub. Date: Sep. 17, 2009

(65) Prior Publication Data
US 2011/0002339 A1    Jan. 6, 2011

(30) Foreign Application Priority Data
Mar. 11, 2008   (GB) .................................. 0804470.3

(51) Int. Cl.
*H04L 12/56* (2006.01)
*H04L 29/12* (2006.01)
*H04W 12/08* (2009.01)
*H04W 88/04* (2009.01)
*H04L 29/06* (2006.01)

(52) U.S. Cl.
CPC ............. *H04W 12/08* (2013.01); *H04W 88/04* (2013.01); *H04L 61/2557* (2013.01); *H04L 63/20* (2013.01); *H04L 29/12481* (2013.01); *H04L 63/0236* (2013.01)
USPC .......................................... 370/401; 370/254

(58) Field of Classification Search
CPC ........................ H04L 63/101; H04L 63/6022
USPC .................................... 370/254, 401; 709/205
See application file for complete search history.

(56) References Cited

U.S. PATENT DOCUMENTS

| | | | | |
|---|---|---|---|---|
| 5,652,790 A | * | 7/1997 | Andruska et al. | 379/230 |
| 7,143,137 B2 | * | 11/2006 | Maufer et al. | 709/205 |
| 2004/0008653 A1 | * | 1/2004 | Cohen et al. | 370/338 |

(Continued)

FOREIGN PATENT DOCUMENTS

| | | |
|---|---|---|
| CN | 101030865 A | 9/2007 |
| EP | 1 538 856 A1 | 6/2005 |

(Continued)

OTHER PUBLICATIONS

Extended European Search Report dated Nov. 28, 2012.

(Continued)

*Primary Examiner* — Dang Ton
*Assistant Examiner* — Mewale Ambaye
(74) *Attorney, Agent, or Firm* — McGinn IP Law Group, PLLC

(57) ABSTRACT

The invention provides for telecommunications user equipment including network access control means operative responsive to control parameters and further including a subscriber module accessible remote from the user equipment and arranged to store the said control parameters for use by the said access control means, and wherein the subscriber module can comprise a mobile equipment offering gateway functionality such as between a public access network and a local IP link.

21 Claims, 8 Drawing Sheets

(56) References Cited

U.S. PATENT DOCUMENTS

| | | | |
|---|---|---|---|
| 2005/0141438 A1* | 6/2005 | Quetglas et al. | 370/254 |
| 2007/0140272 A1 | 6/2007 | Gulliksson | |
| 2007/0294744 A1 | 12/2007 | Alessio et al. | |
| 2008/0201486 A1* | 8/2008 | Hsu et al. | 709/238 |

FOREIGN PATENT DOCUMENTS

| | | | |
|---|---|---|---|
| EP | 1 798 659 A1 | | 6/2007 |
| JP | 2005-168033 A | | 6/2005 |
| WO | WO 02/19664 A2 | | 3/2002 |
| WO | WO 2005/083570 A1 | | 9/2005 |
| WO | WO 2006/040115 A1 | | 4/2006 |
| WO | WO2006/072649 | * | 7/2006 |
| WO | WO2006/128080 | * | 11/2006 |
| WO | WO 2006/128080 A2 | | 11/2006 |
| WO | WO2007/141607 | * | 12/2007 |
| WO | WO 2007/141607 A2 | | 12/2007 |
| WO | WO 2007/141607 A3 | | 12/2007 |
| WO | WO 2007/144737 A2 | | 12/2007 |
| WO | WO 2010/011467 A1 | | 1/2010 |

OTHER PUBLICATIONS

Chinese Office Action with Chinese Search Report dated Jan. 11, 2013.

Japanese Office Action dated Jun. 26, 2013 with partial English translation thereof.

Chinese Office Action and Search Report dated May 21, 2014 with an English translation.

* cited by examiner

| Identifier: '4F61' | Structure: Transparent | Optional |
|---|---|---|
| "No SFI" | | |
| File size: X bytes | Update activity: high | |

Access Conditions:
    READ        PIN
    UPDATE    ADM
    DEACTIVATE  ADM
    ACTIVATE  ADM

| Bytes | Description | M/O | Length |
|---|---|---|---|
| 1 to X1 | NAT Rule Content Object | M | X1 bytes |
| 1+X1 to X2 | NAT Rule Content Object | O | X2 bytes |
| ... | ... | ... | ... |
| $X_1+...+X_{n-1}+1$ to $X_1+...+X_n$ | NAT Rule Content Object | O | Xn bytes |

Fig. 7

| Description | Tag Value |
|---|---|
| NAT_RULE | 'V0' |
| TARGET | 'V1' |
| PROTO | 'V2' |
| TCP | 'V3' |
| IP | 'V4' |
| PORT_SRC | 'V5' |
| PORT_DST | 'V6' |
| HOST_SRC | 'V7' |
| HOST_DST | 'V8' |
| TECHNO | 'V9' |
| OPERATION | 'V10' |

Fig. 8

| Description | Value | M/O | Length (bytes) |
|---|---|---|---|
| NAT_RULE | 'V0' | M | 1 |
| Length | L0 | M | X0 |
| TARGET | 'V1' | M | 1 |
| Length | L1 | M | X1 |
| Target Value | {"PREROUTING", "POSTROUTING", "OUT"} | M | X11 |
| PROTO | 'V2' | O | 1 |
| Length | L2 | M | X2 |
| TCP | 'V3' | O | 1 |
| Length | L3 | M | X3 |
| PORT_SRC | 'V5' | O | 1 |
| Length | L5 | M | X5 |
| Port src value | Note 2 | M | X55 |
| PORT_DST | 'A6' | O | 1 |
| Length | L6 | M | X6 |
| Port dst value | Note 2 | M | X66 |
| IP | 'V4' | O | 1 |
| Length | L4 | M | X4 |
| HOST_SRC | 'V7' | O | 1 |
| Length | L7 | M | X7 |
| Host src address value | Note 1 | M | X77 |
| HOST_DST | 'V8' | O | 1 |
| Length | L8 | M | X8 |
| Host dst address value | Note 1 | M | X88 |
| TECHNO | 'V9' | O | 1 |
| Length | L9 | M | X9 |
| Techno value | {"2G", "3G", "WLAN"} | M | X99 |
| OPERATION | 'V10' | M | 1 |
| Length | L10 | M | X10 |
| Operation value | {"REPLACE", "REDIRECT", "INIT"} | M | X1010 |

Note 1: a value in the form of: IPADDRESS/[MASK]
Note 2: a port String value (0<X<65535)
Note 3: "INIT" value is used with or without TARGET indication. Other indication is useless (e.g. protocol, techno). Purpose of INIT is to flush all Targets or a specific Target (if indicated)

Fig. 9

NETWORK ACCESS CONTROL

TECHNICAL FIELD

The present invention relates to a network access control.

BACKGROUND ART

Within a network environment, IP-based applications are increasingly running on User Equipment (UE) such as mobile devices, Home Gateway solutions, as defined in ETSI Technical Specification 185 003 "TISPAN CNG Architecture and Interfaces", etc., particularly with the emergence of Voice over IP (VoIP) and related internet telephony services. Some such applications could also perform sensitive IP-based access protocols such as, SSH (Secure SHell), FTP (File Transfer Protocol) and SIP (Session Initiation Protocol) sessions, on a public access network and could receive a variety of different formats of IP (Internet Protocol) traffic.

Also, with improving device performance, it is foreseen that a mobile terminal could be interconnected through a private local IP link to embedded internal devices, and/or to external terminal equipment such as by way of a WiFi private network. In the field of the Home Gateway (HG) technology, the HG can also be connected through a private local IP link.

In all such situations, the local IP sub-network is effectively "hidden" behind the UE acting as a border gateway and router to provide connectivity to the IP based services that can be offered by wireless operators. However the UE is often seen as a single device on the public access network, and in some configurations (IPv4, IPv6 stateful autoconfiguration mode) only a single routable, IP address will be allocated. To take account of such configurations, a Network Address Translation (NAT, defined in RFC 3022 "Traditional IP Network Address Translator") based solution is required for management of the addressing of the local sub-network elements in order to map internal/private addresses, i.e. the local-link addresses, to the single routable IP address allocated by the public access network. Filtering functions required for address translation can also be extended to cover firewall type capabilities which can assist in the control of IP traffic, the local IP network security and also protect access to the public network.

Additionally, Session Initiation Protocol (SIP, as defined in RFC3261)/IP Multimedia Subsystem (IMS, as defined by the 3rd Generation Partnership Project in Technical Specification 23.228 that specifies the IMS stage 2) applications including network information such as the IP address, and port number at application layer, in addition to network layer, can also employ Application Level Gateway (ALG, as defined in RFC2663) translations at the border gateway element of the telecommunication mobile device arranged with the local IP network.

Besides, by-passing of NAT during SIP communication, for example by way of the Simple Traversal of UDP (User Datagram Protocol) through NAT (STUN) protocol as defined in RFC3489, is possible since specific protocols transport IP level information at the application level and which are contrary to the network layer philosophy. It is also well known that firewall (whether SIM-based or not) and NAT solutions exist to enable the control and management of IP flows. Further, NAT is often accompanied by an Application Level Gateway (ALG) to monitor the payload of the packet and perform the alteration when IP level information is transported at application layer for example with the SIP protocol.

It is further foreseen that mobile devices will enable users to download a wide variety of IP-based applications requiring connection with different network services through a home operator network. While the application download may be restricted at the time of application installation, there is further desire for security in limiting undesired access at the network level and thereby preventing a potentially malicious application from achieving network-connection. For example subsequent to installation of an IP-based application, the network operator may later notice malicious actions from that application such as the sending of undesired network/application requests are sent and so firewall application/software is then required.

Also, a network operator can enter into agreements with service providers for services such as Instant Messaging applications or VoIP applications. However since future mobile platforms are likely to be open to many IP-based applications, the user may be able to download any application of choice thereby rendering the agreement between the network operator and the service provider(s) potentially ineffective. Besides such agreement may further be limited by the time at which a user can access the IP-based service.

The degree and adaptability of network access control is therefore restricted.

DISCLOSURE OF INVENTION

The present invention seeks to provide for a system and arrangement for controlling and configuring network access and which exhibit advantages over known such systems and arrangements.

According to one aspect of the present invention there is provided telecommunications user equipment including network access control means operative responsive to control parameters and further including a subscriber module accessible remote from the user equipment and arranged to store the said control parameters for use by the said access control means.

According to another aspect of the present invention there is provided a telecommunications system comprising a network element and a telecommunications user equipment as defined above and further including a local IP link and at least one device connected via the local IP link and which may be an embedded device (for instance a Central Control Processing Unit, an Application Control Processing Unit, a Subscriber Identity Module, a SD Card) or external terminal equipment (for instance a PC, a laptop, a Personal Digital Assistant, a handset).

Yet further, the present invention provides for a method of network access control by way of control parameters in a user equipment of a telecommunications system, comprising the steps of storing the control parameters in a subscriber module of the user equipment, and allowing access by network access control means of the user equipment to the subscriber module for use of the said control parameters.

According to yet another aspect of the invention there is provided a method of controlling network access by way of control parameters in a user equipment of a telecommunications system including the steps of remotely accessing a subscriber module of the user equipment for the provision of the said control parameters therefrom.

The invention is described further hereinafter, by way of example only, with reference to the accompanying drawings in which:

BRIEF DESCRIPTION OF THE DRAWINGS

FIGS. 7 to 10 provide tabular illustrations of the coding of NAT to stored NAT elements used within an exemplary embodiment of the present invention.

BEST MODE FOR CARRYING OUT THE INVENTION

Figure 1:
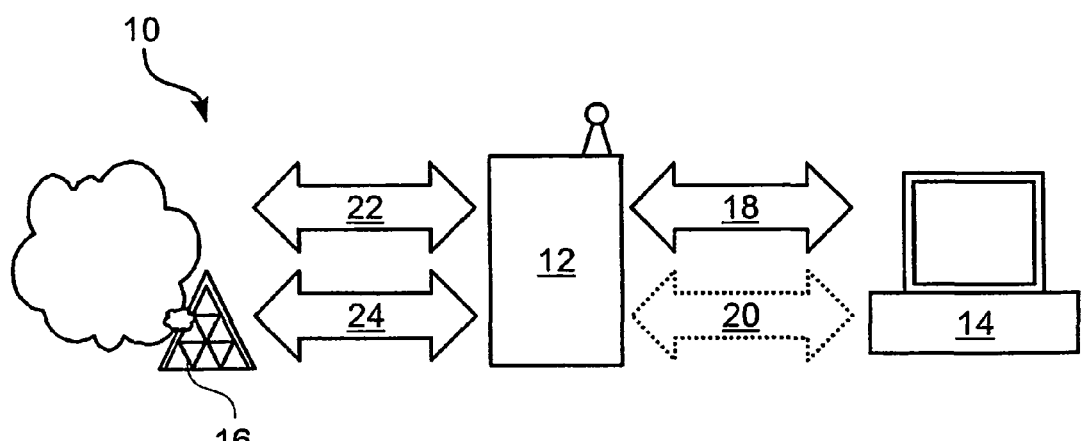
FIG. 1 comprises a schematic illustration of a communications system embodying an example of the present invention.

Turning first to FIG. 1, there is provided a schematic illustration of a communication system 10 in which a mobile radio communications device such as a cell phone handset 12 achieves connectivity with both a local terminal device 14, and a public network 16.

As will be appreciated from the present invention, the handset 12 can function as a network gateway device allowing for IP communication 18 by way of a local link with the terminal device 14, and can also allow for the transfer of ALG parameters and filtering rules 20 with optional exchange/updates capabilities.

IP communication 22 is also provided between the handset 12 and the public network 16 and an update 24 of NAT parameters and filtering rule updates at the handset 22 can be initiated from the network 16.

Importantly, the handset 12 includes a subscription module such as a SIM or USIM which provides for NAT and IP filtering within the handset 12 on the basis of the filtering rules and NAT parameters found therein and as described further below.

There are currently no mechanisms to enable an operator to manage IP traffic and NAT in UE including a subscription module at pre-provisioning and which would ensure that the appropriate applications will be granted network level access. Besides such NW Access can further be limited in time and dependent upon the localisation.

As will be appreciated, the present invention serves to enable the operator to limit the access of the network services to IP-based applications on the basis of information stored in a subscription module such as a SIM or USIM.

The invention is embodied in a device, system and method serving to enable NAT, IP filtering and QoS settings in a UE such that an operator can restrict access to specific applications, control addition of further application dynamically loaded on the UE and provide for pre-provisioning of security rules enabling the device to safely connect to the IP-based network. As such, the invention enables the operator to grant network access to specific services for which it may have concluded appropriate agreements with service providers.

The UE can be in the form of a mobile phone, personal digital assistant with mobile telecommunication capabilities or Home Gateway etc., which, with a subscription module, can comprise a Border Gateway element having an access-control functionality by means of at least one of NAT, Firewall, or Quality of Service elements.

In the form of a border gateway, the device can be interconnected via a local IP link to other internal devices or external terminal equipment devices requiring IP connectivity to a wireless public access network.

The Border Gateway can then act as a router for a local IP link, applying, as required, NAT parameters and filtering rules.

The UE can have a well defined API to access the NAT parameters and/or filtering rules from the subscriber module element, and the NAT and filtering rules can be read, undated, or removed as required.

In particular, the NAT parameters can be modified dynamically during an IP-based session such as for example a SIP session or a media session.

The NAT parameters can further be used to perform additional ALG translation functions.

The storing of the control parameters such as the NAT/Filter/QoS rules and preferences in the subscription module to enable operator and user control on the incoming or outgoing IP traffic advantageously serve to enable pre-provisioning and improved operator control on the IP traffic at the UE.

Figure 2:
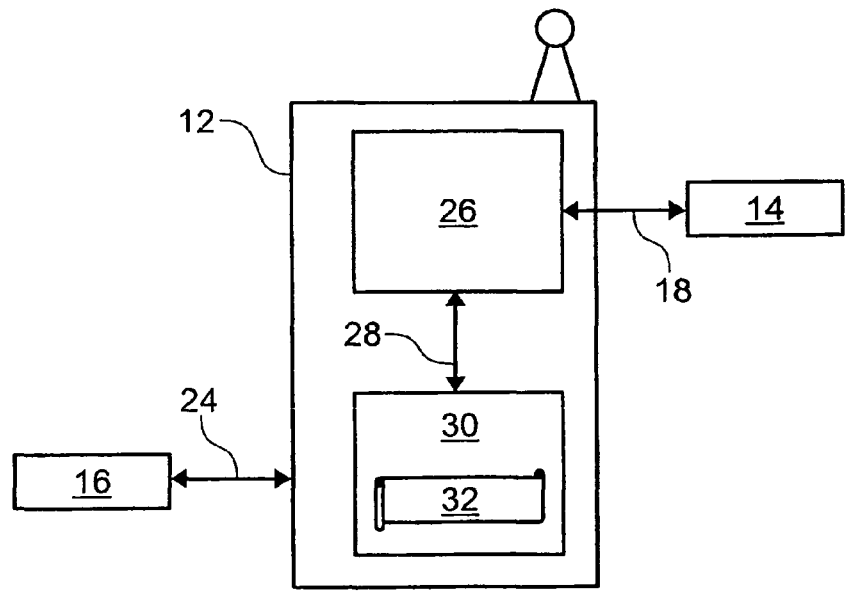
FIG. 2 is a further schematic representation illustrating in particular the UE handset of the system of FIG. 1.

Turning now to FIG. 2, there is provided a schematic illustration of a network gateway device such as the cell phone handset 12 of FIG. 1.

Respective connectivity 18, 24 between the local terminal device 14 and public network 16 is again illustrated alone with the further functional characteristics of the handset 12.

That is, the handset 12 includes a border gateway element 26 with NAT and/or firewall functionality and which is arranged to communicate with read/update/remove operators, NAT and filtering rules preferences 28 with a subscriber module 30 of the handset 12 which, as noted, can comprise a SIM or USIM.

Within the subscriber module 30 there is stored the operators NAT/NAPT/ALG and filtering rules preferences.

As will be appreciated from the following, the appropriate locations within the subscriber module 30 are arranged to be accessed and updated by way of the communication link 24 from the public network 16 such that a network operator can update, and otherwise enable or disable, the appropriate NAT and firewall functionalities so as to allow for dynamic, adaptation of the gateway functionality of the handset 12.

It will be appreciated that the invention is well suited to configure incoming/outgoing IP traffic to a local IP Link such as the IP-based application residing on the same device in which is located the firewall/NAT solution or the IP-based application residing on another device connected through the IP-local link. Undesired applications are consequently prevented from accessing network services either such as local IP Network Services or public network services, if they do not meet the operator policy.

As illustrated, an example of the overall system comprises a network element a UE with IP-technology capability, a local IP link, and one or more embedded internal devices and/or external terminal equipments, connected through the local IP link and requiring IP connectivity to public access network. The network element can of course that transfers IP traffic over any transport technology and underlying Access Technology such as 2G, 3G, WiFi, WiMAX, XDLS.

As required for the border gateway, a UE single routable IP address will be available and as provided by wireless public access network, such as an IPv4 or an IPv6 public address to be used by NAT functions to perform address translation. Also provided is a border gateway link-local IP address for communication on IP private local link, acquired for example at startup via IPv4 or IPv6 configuration procedures. Further, each internal device/external terminal equipment a link-local IP address is provided for communication on private local link, acquired for example at startup via IPv4 or IPv6 configuration procedures, will be used by NAT functions to perform address translation.

For any IP based application or service, the UE or external terminal equipment will use its link-local address in all IP packets. In a scenario in which the ALG function is implemented with the NAT function, the link-local IP address and port will also be used to build all application level messages. The user or device that controls the UE may also enable/disable the gateway capabilities using a field value in the subscription module. As such the gateway can disable any IP traffic from any of the devices configured in the local IP network At the UE, the NAT function can serve to control replacing the link-local IP addresses (and ports) of the messages with the UE public IP address and ports for all outgoing IP flows. NAT tables can have been previously populated with the appropriate information such as IP flow direction, source and destination IP addresses and ports in order to filter and translate the IP traffic. For incoming flows the IP address would be replaced by the appropriate link-local IP address where resides a network service accessible from the outside network.

In one arrangement of the invention, the filtering and translation information that can be stored can include optionally the IP flow direction, i.e. whether outgoing or incoming flow, the original calling/callee IP addresses and/or ports for filtering purposes, for translation purposes, the new calling/callee IP addresses and/or ports can be included and which comprise a combination of both port and IP address for translation purpose can be used in case of NAPT (Network Address Port Translation, also known as "Port Address Translation" or "Reverse Address and Port Translation").

In general at least a subset of the filtering and/or translation rules must be provided. The NAT is used to perform translation of address and/or port whereas the filtering is used to reject/accept a particular type of traffic. Of course QoS rules (Quality of Service) are used to apply a specific QoS Policy on a particular type of traffic, or on a given Interface.

Any NAT parameters pre-configured in the subscription module will advantageously be used to populate the NAT table for "static NAT" purposes such as for Network address/port Translation for connection initiated outside the local network. Such an example could comprise a server application having local IP non routable address accessible by a network operator client for device management purposes. Another example would arise when a client application of a remote HG network desires to access a server application of the local HG network, such that point-to-point sessions can be allowed between the HG routers.

The filtering and translation rules applied by a NAT Solution for Source NAT (Alteration of the source address at POSTROUTING or OUT) would be

[local IP, local port], [callee IP, callee port] ☐ [public IP, public port], [callee IP, callee port]

In this case the packets issued from the local IP address on the local port and destined to the callee IP address on the callee port will be modified into packets issued from the public IP on public port and destined to callee IP and callee port. The source information is translated thereby enabling the callee to reply by sending the packets to the public IP address.

Wherein the filtering and translation rules applied by a NAT Solution or the Destination NAT (Alteration of the destination address at PREROUTING) would be

[calling IP, calling port], [public IP, public port] ☐ [calling IP, calling port], [local IP, local port]

In this case the destination information is translated by the local information of the IP local IP link.

For clarification:
☐: refers to an "alteration" operation from a given logical expression to another logical expression.
POSTROUTING refers to a node wherein the data packets are modified based on routing decision before being delivered to the network on an appropriate network interface.
OUT refers to a wherein the data packets altered before routing decision is made.
PREROUTING refers to a node wherein network addresses are resolve before being forwarded to node where filtering can be done.
PREROUTING can be used for Destination NAT purpose also known as "Static NAT".

It should be noted that the local IP address may also relate to a pool of addresses by indicating the mask value: e.g. /16 or /8 if the network devices are to be configured with an address from a predefined set of IP addresses, for example as from a sub-network.

While the port may be specified if it is statically attributed, since the port (or service) used can change dynamically, the value can be null in the Access Control Parameters and the port is then dynamically set by the Firewall/NAT solution.

Insofar as the Public IP address may not be known, the information available in the Access Control Parameters can therefore include the type of Radio Access Technology (RAT) which is usually attached to a network interface. Consequently by indicating this information, the alteration of the IP address just needs to replace the address of the packets by the one affected on the Interface for source NAT.

Advantageously a domain name will be provided in place of an IP Public Address thereby requiring the UE to further resolve it into an IP address using Domain Name Resolution (DNS) means, while the DNS Server address can be retrieved using Dynamic Host Configuration Protocol means.

The destination NAT can be used when external devices want to access a network service attached to the link-local IP address. For a specific service, for example an operator application server for configuration purpose, the application must be arranged to provide security access mechanisms to ensure that only the legitimate persons can access the server. This can be controlled by way of the NAT Information for the translation to he made and the service to he accessible For traffic and device access control, other Access Control parameters can be added such as the number of IPsec (Internet Protocol Security, whose reference architecture is defined in RFC 2401) sessions allowed, whether or not the Gateway is enabled for all types of connection supported by the device such as 2G/3G, WLAN (Wireless Local Area Network), XDSL (Digital Subscriber LAN), etc., whether or not NAPT is enabled and whether or not an application, and if so which application, is allowed to modify parameters The NAT/Filter/QoS Information stored in the USIM can be included in the Configuration Information used a Customer Network Gateway (CNG). In this example of the invention, an Interface is required between the CNG-NAPT and Firewall function of the CNG and subscription module for retrieving the information of present invention.

When a UE starts up, NAT rules, IP filtering rules and QoS rules can be read from SIM/USIM so as to configure the Access Control element. Also, the information about data and Time duration, location, and whether the gateway shall be turned on or off is retrieved if present. When the telecommunication mobile device establishes an IP bearer with the network as well as a PDP (Packet Data Protocol) context for 3GPP Access Network, then IP communication can be received by the telecommunication mobile device if the PDP Context refers to an IP context.

During any currently established IP communication, the filtering rules and NAT will apply. On this basis, some of the traffic, whether it is incoming or outgoing traffic, is not blocked and filtered at the border gateway element. For example, in the example of an embedded web server listening on a given port number with a specific IP address, incoming traffic can be filtered so as to give access to incoming connection with the server only. In addition, for SIP based communication NAT coupled with for example the STUN protocol can be used to enable network address translation during data transmission sessions.

Files are added in to the USIM. The $AFD_{USIM}$ shall be selected using the AID (Application Identifier) and information in EFDIR as defined in 3GPP TS 31.102. The services can be added at first bit of byte 10 within $EF_{UST}$ structure so that the telecommunication mobile device can select those services for the purpose of NAT and/or Filtering rules execution, and/or QoS settings and as shown in the following table of available services for NAT parameters and filtering rules.

| Service Contents: | Service n °81: | NWCTRL |
|---|---|---|
| | Service n °82: | RFU |
| | Service n °83: | RFU |
| | Service n °84: | RFU |
| | Service n °85: | RFU |
| | Service n °86: | RFU |
| | Service n °87: | RFU |
| | Service n °88: | RFU |

Service 81 relates to NAT/FILTER/QOS (NWCTRL) Service. While the remainder are designated Reserved for Future Use (RFU). Coding of this Service is shown in the following table although it should be appreciated that the value "service n °81" is merely illustrative and could be any appropriate value.

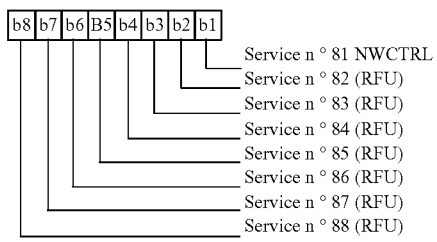

The Elementary Files $EF_{NAT}$, $EF_{FILTER\_}$ and $EF_{QOS}$ contain the coding for NAT Parameters, IP Filtering parameters and QoS parameters respectively.

Figure 3:
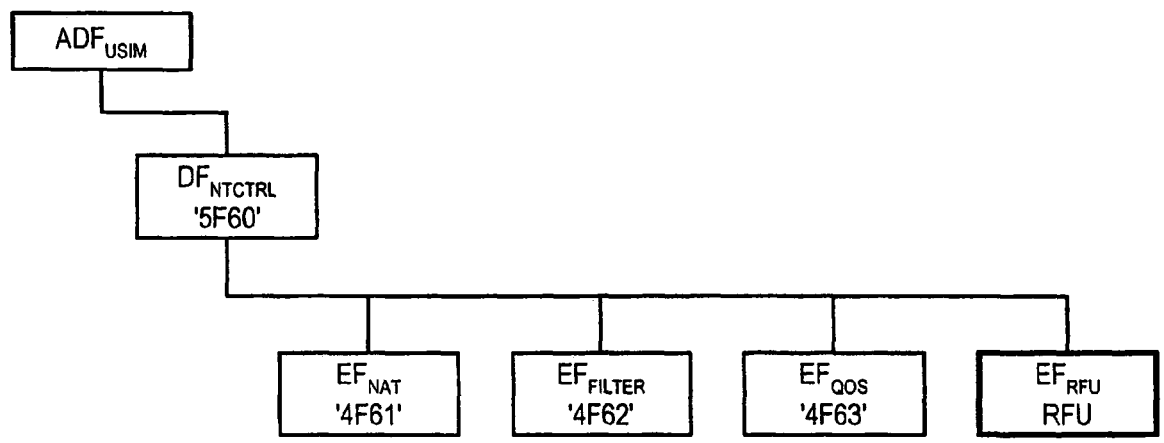
FIG. 3 illustrates an example of the storage structure for NAT, filter and QoS identifiers according to an exemplary embodiment of the present invention.

FIG. 3 provides an example for storage of the $EF_{NAT}$, $EF_{FILTER}$ and $EF_{QOS}$ identifier information respectively such as "4F61", "4F62", "4F63" according to an exemplary embodiment of the invention. It should be appreciated however that there could be further EF for network access control but this is not relevant to the subject matter of the present invention.

Figure 4:
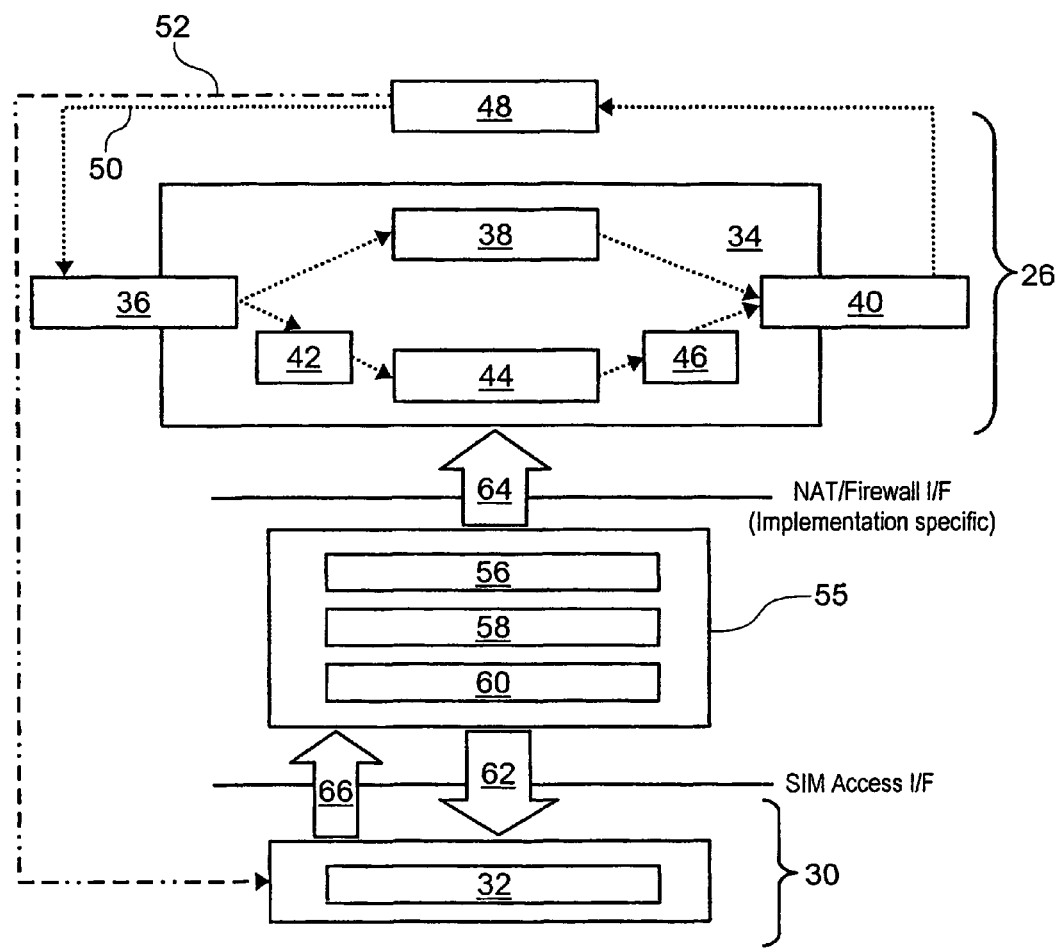
FIG. 4 is a schematic illustration of the operational relationship between the access control element and subscription module of an exemplary embodiment of the present invention.

Turning now to FIG. 4, there is provided a schematic system overview of an exemplary embodiment of the present invention employing the border gateway element 26 and subscriber modules 30 of FIG. 2.

Within the border gateway element 26 there is provided NAT/firewall functionality 34 which includes a pre-routing table 36 and post-routing 40, a forward table 38, an IN table 42, local processor 44, and an OUT table 46.

Subsequent to post routing by the POSTROUTING processing unit (or POSTROUTING node), packets are delivered as illustrated to the Network Interface Device (NWIF) 48 while incoming packets are forwarded to the pre-routing processing unit 36.

As discussed further below, over the air updates 52 will also be delivered from the NWIF 48 directed to the subscriber module 30 for updating of the NAT filtering and OoS rules 32.

Between the border gateway element 26 and the subscriber module 30 there is provided a NW IP module manager 55 which is arranged to retrieve 56, check 58 and apply 60 rules as appropriate from the subscriber module 30 through the reading 62 thereof and subsequent application 64 to the NAT/firewall functionality 34. Also delivered from the subscription module 30 to the NWIP policy manager is a trigger 66 for effectively triggering operation of the NWIP policy manager upon, for example receipt of an OTA update.

This causes the NW IP Policy Manager to read again the NAT/FILTER/QOS values in order to reset the IP Policy for the user plane in the UE. An example of such use is when the Operator Network detects the localisation of the UE, if for example, the UE is a mobile agent, and requires a change in the IP Policy, for example when the UE moves from its home network to its corporate network. Another usage example is when the operator updates the user's subscription, such as when a service is no longer time-restricted, or no longer accessible due to subscription limitation, and the Network Access Control parameters are modified accordingly.

In further detail, rules are applied in the Tables of the NAT/Firewall for NAT/Filter or QoS purposes and the tables 36, 40, 42, 44 and 46 are used in different phases of the packet routing process through the device. The pre-routing node 36 manages incoming packets from the outside before they are routed. This is usually used to change information such as the destination information (DNAT) of a connection.

The postrouting node 40 manages outgoing packets after the routing decision by the device and this is usually used to change information such as the source information of a connection.

The forward node 38 serves to filter packets that the local device has to transmit and the IN node 42 filters packets destined to the local device 44 while the OUT node 46 filters packets transmitted by the local process of the device 44.

The following table provides an overview of an example of the NAT/Filter/QoS rule structure.

| Ref | Structure overview | Values |
|---|---|---|
| | NW_Flow_Restriction_Type | NAT, FILTER, QOS |
| A | Target | |
| A1 | | PREROUTING |
| A2 | | POSTROUTING |

-continued

| Ref | Structure overview | | | Values |
|---|---|---|---|---|
| A3 | | | | FORWARD |
| A4 | | | | IN |
| A5 | | | | OUT |
| B | Flow_Properties | | | |
| B1 | | Protocol | | |
| B11 | | | {TCP, UDP} | |
| B111 | | | Port_src | 0 < x < 65535 |
| B112 | | | Port_dst | 0 < x < 65535 |
| B113 | | | [Flags] | BIT MASK {SYN ACK FIN RST URG PSH ALL NONE} (MUST not be used for UDP protocol) |
| B114 | | | RFU | Reserved for Future Use (RFU) |
| B12 | | | IP | |
| B121 | | | Host_Src | IP@[/Masque] |
| B122 | | | Host_Dst | IP@[/Masque] |
| B123 | | | Version | {V4, V6} |
| B124 | | | QoS | 1 byte (DSCP field for Ipv4, Traffic Class for Ipv6) |
| B125 | | | Hop | 1 byte (TTL for IPv4, Hop Limit for IPv6) |
| B126 | | | RFU | RFU |
| B13 | | | IPSec | N/A (RFU) |
| B14 | | | ICMP | N/A (RFU) |
| B15 | | | RFU | RFU |
| B2 | | Techno | | |
| B21 | | | Techno_Value | {2G, 3G, WLAN, RFU} |
| B22 | | | [Mac@] | Mac AddressValue (the size depends on the Techno) |
| B23 | | | QOS_Class | {GBR_LOW, GBR_MEDIUM, GBR_HIGH, NGBR_LOW, NGBR_MEDIUM, NGBR_HIGH} |
| B24 | | | RFU | RFU |
| B3 | | Direction | | UNICAST, MULTICAST, BROADCAST |
| B4 | | RFU | | RFU |
| C | Operation | | | |
| C1 | | NAT_OPERATION | | |
| C11 | | | | INIT |
| C12 | | | | REPLACE |
| C13 | | | | REDIRECT |
| C14 | | | | RFU |
| C2 | | FILTER_OPERATION | | |
| C21 | | | | DROP |
| C22 | | | | REJECT |
| C23 | | | | ACCEPT |
| C24 | | | | RFU |
| C3 | | QOS_OPERATION | | |
| C31 | | | IP_TTL | TTL_Value (A number corresponding to a $$ hop $$ value) |
| C32 | | | IP_TOS | {MINIMIZE_DELAY, MAXIMIZE_THROUGHPUT, MAXIMIZE_RELIABILITY, MINIMIZE_COST_NORMAL_SERVICE} |
| C33 | | | TECHNO_CLASS | {GBR_LOW, GBR_MEDIUM, GBR_HIGH, NGBR_LOW, NGBR_MEDIUM, NGBR_HIGH} |
| C34 | | | RFU | RFU |
| C4 | RFU | | | RFU |
| D | RFU | | | RFU |

It should be noted that time and location restrictions are not illustrated in the structure of this table which is provided by of example only. However it will be appreciated that such information could be added to the structure of a rule by using for instance a "Date" and a "Location" field.

The rules are read in FIFO and applied in FIFO with regard to the subscriber module.

The NW_Flow_Restriction_Type can be a NAT EF element. Filter EF element, or QoS EF element. Each EF contains information in TLV Format and this information is a succession of rules. Such rules are decoded by the device to perform the correct configuration of the Firewall/NAT solution using specific API.

The above mentioned EF can include zero, one or several rules (which shall be read in FIFO).

The information of a Rule contained in any of the above EF can include

Target: which "Node" of the packet routing system the rule applies

Flow Properties (or matching criteria): what needs to be analysed in the IP traffic flows (which protocol, which flag of a protocol, which source/destination IP addresses, which service port, which RAT technology is used—such as 2G or WLAN—and potential QoS Class and potential Medium Access Control (MAC) address, and what kind of IP flows—such as unicast, multicast, broadcast)

Operation: defines the action to be done.

INIT: should be present as a first entry to flush the tables at startup of the device.

REPLACE: used for NAT purpose to replace IP@ of packets by the one of the right Interface (indicated in the matching criteria). Depending on the Target, this can be interpreted, as the well known SNAT, DNAT, and MASQUERADE.

REDIRECT: used for NAT purpose to replace Destination address by the address of the local device.

DROP: used for filtering purpose (the packet is destroyed at a specific "node")

REJECT: used for filtering purpose (the packet is destroyed but a error message shall be returned)

ACCEPT: used for filtering purpose (the packet is allowed at a specific "node")

The rules can be stored in the subscription module in TLV format.

For NAT and FILTER, the semantic should be understood as:

[TARGET] [MATCHING CRITERIA ON THE FLOW] [ACTION]

For QoS, the semantic should be understood as:

[TARGET] [MATCHING CRITERIA ON THE FLOW] [APPLY QOS SETTINGSI

As will be appreciated, QoS behaves in a rather different manner from NAT and FILTER. "APPLY QOS" consists in setting one or more specific value(s) in the flow characteristics (e.g. set a max TTL value, set a bandwidth value for a given techno, etc. . . . ).

Figure 5A:
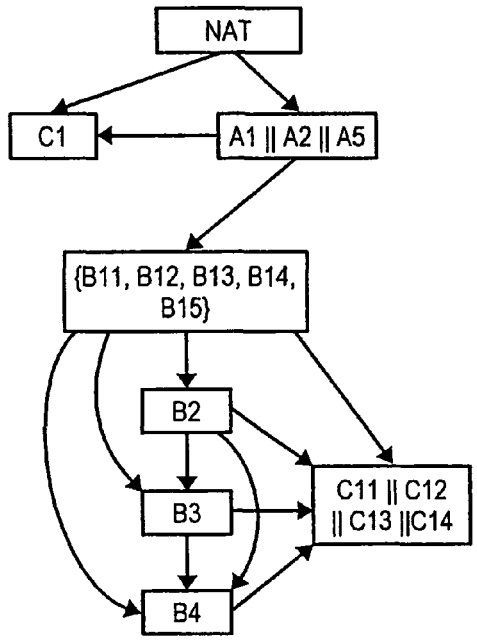
FIGS. 5*a*, 5*b* and 5*c* are schematic illustrations of potential operations for arriving at dynamically selected rule structures for achieving the network access control and in accordance with an exemplary embodiment of the present invention.
Figure 5B:
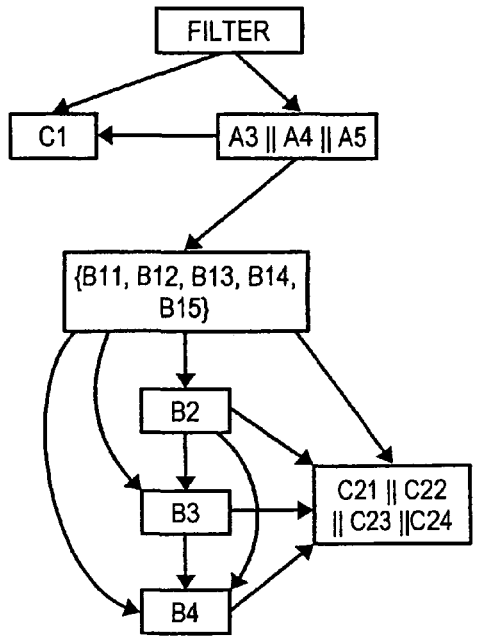
Figure 5C:
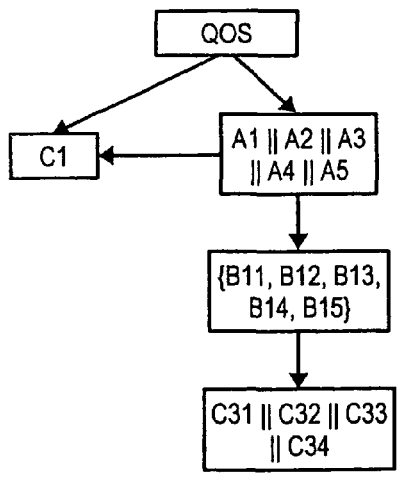

FIGS. 5a-5c illustrate the possible parameter association to be used by the NW IP Policy Manager as discussed above.

It should be noted that all operation are not possible for all kind of Network Access control (i.e. NAT, FILTER or QOS).

The following operators are used in FIGS. 5a-5c:

{ }: a combination of multiple matching criteria. There can be only one matching criteria or a combination of several matching criteria.

||: a "Logical OR". It is a matching criteria OR another matching criteria but both cannot apply at the same time.

&: a "Logical AND". All matching criteria indicated apply.

Therefore—according to the association scheme illustrated in the FIGS. 5a-5c—a NAT rule can be: "NAT->A1->B11->C12" meaning that NAT applies to PREROUTING node for a TCP or UDP protocol and which is to be applied in said PREROUTING node.

Other combinations could be:

NAT->A1->B11->B12->C12
NAT->A2->B13->B2->B3->C12

The same mechanism is applied to FILTER AND QoS RULES.

Figure 6:
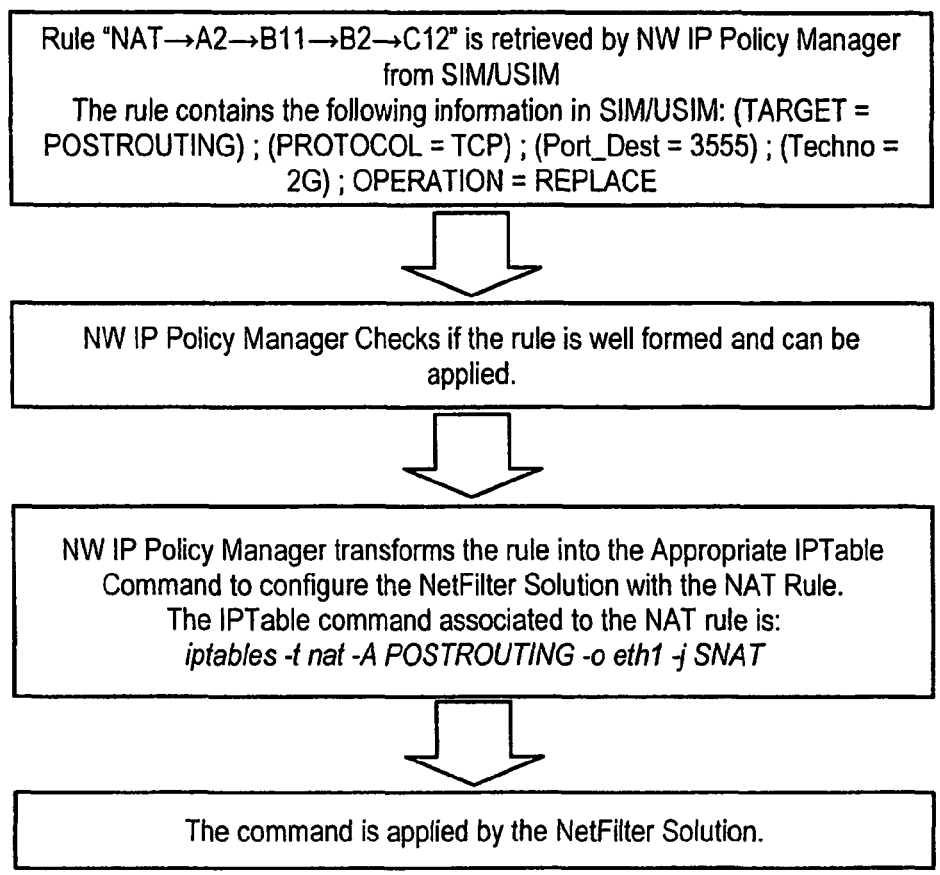
FIG. 6 is a flow diagram illustrating the implementation of an arrangement and method embodying the present invention.

Turning now to FIG. 6, there is provided an example of use of the proposed solution. In the example the Firewall/NAT solution is NETFilter.

A NAT rule is retrieved from the USIM. The rule is in the form of "NAT->A2->B11->B2->C12" and it is interpreted from the information stored in the $EF_{NAT}$ element of the SIM/USIM:

TARGET=POSTROUTING
PROTOCOL=TCP
Port_Dest=3555
Techno=2G
OPERATION=REPLACE.

This rule is transformed in the appropriate command to be used by IPTable of Netfilter. It is interpreted as: "Replace the IP address of all TCP packets going out via 2G Interface and whose destination port is 3555 by the IP address configured on the 2G out Interface".

In the example the interface eth1 is associated to the 2G Interface.

With regard to FIGS. 7-10, there is provided an example of coding for NAT EF elements arranged to be employed within an embodiment of the invention.

For convenience the example is limited to the following functionality:

TCP Support (with source and destination ports indication)
IP Support (with IP Source and Destination addresses indication)
Radio Access Technology type=2G, 3G, WLAN
QoS is not supported
Possible NAT operations are: REPLACE, REDIRECT, INIT Further indication about time/date, location and related profile indication could be added as required.

As illustrated in FIG. 7, the structure is considered transparent and there is no SDU Format Information (SFI). The element is made optional and the update requires ADMIN privileges (ADM). As such the operator may only be the only one to change this value (e.g. via OTA update).

The information stored in the NAT EF element is coded using TLV (Tag, Length, Value) format.

If service n °81 is "available", this file shall be present.

This $EF_{NAT}$ contains a succession of one or more NAT Rules.

FIG. 8 provides the Tags values used in the exemplary embodiment of the invention for NAT structure storage. Those Tags are coded on 1 Byte. NAT_RULE: the first tag of the whole content. The length identifies the total size of the other TLV blocks.

TARGET: identifies the "Node" to which the NAT rule is applied. The node indicates at which step of the packet routing by the UE should be done the translation.

PROTO: used to further indicate protocol related information. Such protocol can be a Transport layer protocol or Network layer protocol for which specific information should be used as matching criteria if indicated in the structure.

TCP: use to indicate that the NAT rule applies to flows transported via TCP protocol.

IP: use to indicate that the NAT rule applies to IP flows. In such a case at least the source port or the destination port SHALL be indicated.

Further indications are:

PORT_SRC: use to indicate the source port of TCP flows to which apply the NAT rule
PORT_DST: use to indicate the destination port of TCP flows to which apply the NAT rule
HOST_SRC: use to indicate the source IP address of the IP flow to which apply the NAT rule
HOST_DST: use to indicate the destination IP address of the IP flow to which apply the NAT rule
TECHNO: use to indicate on which Radio Access Technology interface SHALL be apply the rule.
OPERATION: use to indicate what is the NAT Action to be performed when matching criteria are met (replace, redirect).

FIG. 9 presents the NAT Rule content structure in TLV Format using the Tags of FIG. 8. As will be appreciated, not all Tags are mandatory and, if an optional Tag is indicated, then the Length and Value are mandatory such that they MUST be indicated.

Figure 10:
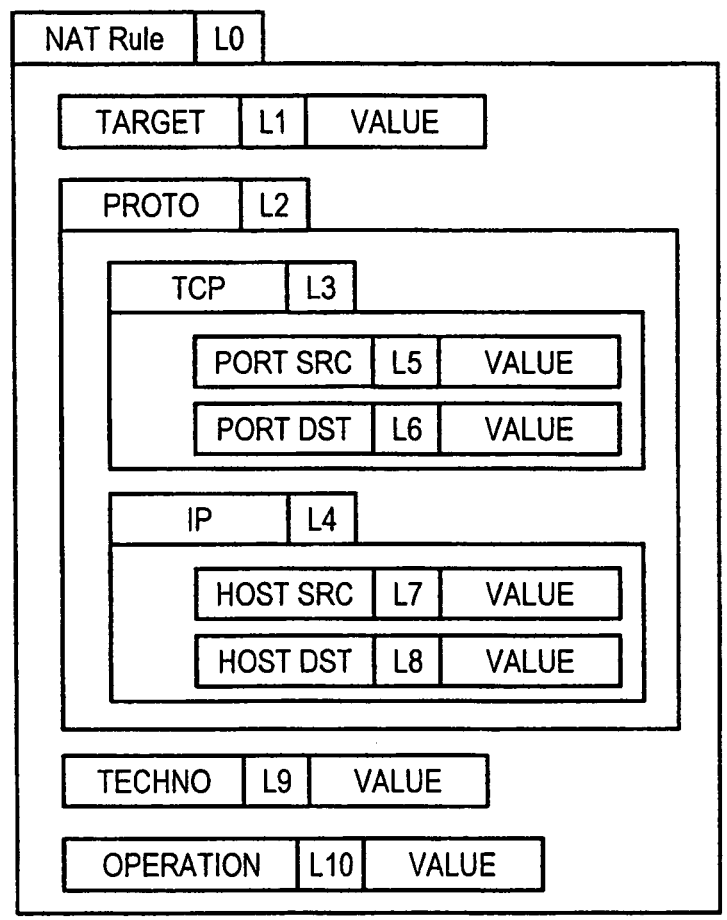

Finally, FIG. 10 illustrates the NAT Rule Content structure in TLV Format of FIG. 9 and which mainly shows to which payload is related the length for each tag.

Other mechanisms for the external device to update NAT tables and retrieve the public IP address are also possible and which can provide support for UPnP/IGD (Universal Plug & Play/Internet Gateway Device).

ALG function is arranged to map IP addresses and ports in all applications level messages supported and the ALG may require NAT configuration information to perform its own filtering/translations.

The ALG function can be either collocated with the NAT functions, or implemented separately by internal devices and/or external terminal equipments. In this case the NAT access control element must be able to exchange configuration information for ALG processing. NAT tables configuration by ALG may also be possible.

As will be appreciated, the described method includes the storage of the preferences on the SIM/USIM attached to a UE reading, removing and updating of said preferences to be used by the UE during IP communication for IP based services. The NAT/ALG/NAPT pre-provisioned configurations, parameters and preferences are advantageously set up at a switch-on of the UE to secure and filter the IP traffic.

The invention is well suited to configure incoming/outgoing IP traffic to local IP Link such as an IP-based application residing on the same device in which is located the firewall/NAT solution or the IP-based application residing on another device connected through the IP-local link. Undesired applications are consequently prevented from accessing network services (either local IP Network Services or Public network services) if they do not meet the operator policy and the contract that the user has subscribed to.

The invention can therefore enable restriction for network access to IP-based applications which can further be based on date and time duration associated with the control parameters and the settings can vary depending on the location of the UE. Moreover easier application of said control parameters will be performed thanks to profile settings associated with the control parameters thereby leading to personalized network access settings.

According to one aspect of the present invention there is provided telecommunications user equipment including network access control means operative responsive to control parameters and further including a subscriber module accessible remote from the user equipment and arranged to store the said control parameters for use by the said access control means.

The invention can prove advantageous in facilitating operator and user control of network access. In particular, updates that can only be performed by the operator can be provided in a restricted area in the subscription module. Also, IP policy rules can be applied when the user equipment is turned on and this can include other IP-based session information such as the number of IP sessions allowed.

The network operator can therefore perform IP traffic analysis and dynamically set filtering rules to block undesired traffic which would not respect a service agreement. When a UE allows IP-based application installation, the service management becomes complex and the operator cannot guarantee high level of control which may cause a breech of the agreements the operator has entered into with the service provider(s). Therefore it should be possible for the operator to define a local IP based policy applied on each individual UE and which may depend on the location of the UE (e.g. at a corporate network or at home or in outdoor network), the subscription, and IP security level to be applied.

The telecommunications user equipment can comprise a network gateway device providing access to the external/public network to internal devices located in the local IP sub-network, and the invention advantageously exhibits the possibility for the user to turn on/off the gateway functionality.

Further, the telecommunications user equipment can comprise a router between a public network and IP local link, and the subscriber module can of course comprise a SIM (Subscriber Identity Module) or USIM (Universal Subscriber Identity Module, as defined by the 3rd Generation Partnership Project in the Technical Specification 31.102) card.

In one aspect of the invention, the telecommunications user equipment comprises a mobile radio communications device.

Preferably the control parameters comprise at least one of NAT, filtering, and/or quality of service preferences.

Preferences are further dependant upon the location of the UE (for instance in outdoor, home, or corporate network, the settings may vary). As such the control parameters may comprise an indication of which situation they apply to.

Further said control parameters are associated to time restriction and as such the control parameters may only be applied at a given date for a defined period of time thereby limiting the access to the specific applications depending on the contract the user has subscribed to.

The telecommunications user equipment can advantageously include an Application Programming Interface (API) for retrieval of the parameters from the subscriber module by the control means.

The telecommunications user equipment can include a Network IP (NWIP) policy manager for retrieval and application of the said control parameters.

According to another aspect of the present invention there is provided a telecommunications system comprising a network element and a telecommunications user equipment as defined above and further including a local IP link and at least one device connected via the local IP link and which may be an embedded device (for instance a Central Control Processing Unit, an Application Control Processing Unit, a Subscriber Identity Module, a SD Card) or external terminal equipment (for instance a PC, a laptop, a Personal Digital Assistant, a handset).

Yet further, the present invention provides for a method of network access control by way of control parameters in a user equipment of a telecommunications system, comprising the steps of storing the control parameters in a subscriber module of the user equipment, and allowing access by network access control means of the user equipment to the subscriber module for use of the said control parameters.

The said parameters can be further associated with time and location restrictions. Also, the said parameters can be further associated with one or more configuration profile for the network access control means to easily apply those control parameters. For examples such a profile may refer to a "child profile" corresponding to a set of control parameters enabling access limitation only to child specific applications.

Besides the control parameters, when referring to NAT rules application, can be further adaptive to the Radio Access network Technology (RAT) Interface. That is a RAT interface can be deduced according to the information indicated in the said control parameters. As such, different settings can be applied for different types of RAT such as a GPRS Evolved Radio Access Network (GERAN) RAT, a Universal Terrestrial Radio Access Network (UTRAN) RAT, Evolved UTRAN (EUTRAN) RAT or a WiFi RAT, or a WiMAX RAT.

The parameters can be factory configured and further be updated, or they can be dynamically provisioned by way of remote access means.

The method can employ remote access of the subscriber module for provisioning of the control parameters.

In particular, the said remote access can be provided for pre-provisioning of the control parameters.

Yet further, the said remote access can allow for updating of the control parameters.

According to yet another aspect of the invention there is provided a method of controlling network access by way of control parameters in a user equipment of a telecommunications system including the steps of remotely accessing a subscriber module of the user equipment for the provision of the said control parameters therefrom.

Again, such remote access can allow for pre-processing of the control parameters, and the said remote access can allow for updating of the control parameters within the subscribed module and which can comprise an over the air update procedure.

In one particular exemplary embodiment said remote access can allow for updating of the control parameters within the subscriber module on the basis of an IP-based embedded server in the UE (either in the mobile communication radio device or in the subscriber module), and said embedded server allowing for provisioning of said control parameters, and said embedded server receiving incoming requests if they are issued by the legitimate remote access (e.g. this can be achieved by pre-provisioning the remote access identifier by way of an IP address or domain name).

In another particular exemplary embodiment said remote access can allow for updating of the control parameters based on UE location thereby leading the subscriber module to trigger the access network control means for application of the new access network control settings by way of NAT rules, filtering rules or QoS settings to specific IP traffic.

As with the device and system defined above, the control parameters within the method can comprise one or more of NAT, filtering and/or quality of service preferences.

The proposed solution enables the operator to limit the access of the network services to IP-based applications and on the basis of information stored in the subscriber module. Such information can be applied in a Firewall/NAT software or hardware solution, for example as an IP security policy that can be retrieved from the subscriber module.

Such stored information can be in a generic format, stored in the subscriber module, and to be used irrespective of the type of NAT/Filtering Solution employed in the UE, and such as Netfilter, IPchain. IPFilter and IPFirewall fire walling tools.

Such stored information can alternatively be formatted in a script file, stored in the subscriber module, and to be used irrespective of the type of NAT/Filtering Solution employed in the UE, thereby requiring said Solution to execute or interpret said script for the application of said control parameters.

The present invention can therefore advantageously provide a method and system for assisting network operators in the definition of their IP Policy by way of for example IP filtering rules, NAT pre-configuration, authorized port and gateway on/off control.

As noted, in one arrangement the invention is based on the concept of a UE comprising NAT/filtering capabilities, and a subscriber module such as for example a SIM or USIM for the storage of NAT information and filtering rules.

By means of the present invention an operator can control IP based services running on a telecommunication device for which a NAT is required and firewall rules need to be applied for security and IP traffic control purpose. As such the invention can provide means for an operator mobile device to control outgoing and incoming IP traffic at the "end device" having a public IP address and such as a mobile device, or a Home/Corporate Gateway with a SIM/USIM. Data is stored and may be pre-provisioned in the SIM or USIM and can be updated by the operator such as by way of Over-The-Air (OTA) functionality or otherwise.

It should be appreciated that the invention can be employed with any kind of internal device or external terminal equipment implementing IP based applications and connected via an IP local link, located behind a device, for example, a Mobile Equipment or a Corporate Customer Gateway, acting as a router and performing NAT to convert link-local addresses into routable addresses assigned by network and in which is applied firewall rules.

While the invention has been particularly shown and described with reference to exemplary embodiments thereof, the invention is not limited to these embodiments. It will be understood by those of ordinary skilled in the art that various changes in form and details may be made therein without departing from the sprit and scope of the present invention as defined by the claims.

This application is based upon and claims the benefit of priority from United Kingdom patent application No. 0804470.2, filed on Mar. 11, 2008, the disclosure of which is incorporated herein in its entirety by reference.

The invention claimed is:

1. A cellular mobile telecommunications device, including:
   a network access controller operative, responsive to control parameters, to cause the cellular mobile telecommunications device to perform a router functionality including a network address translation;
   a subscriber identity module accessible remote from the cellular mobile telecommunications device and arranged to store said control parameters for use by said network access control controller; and
   a module manager located between the network access controller and the subscriber identity module, said module manager being located within the cellular mobile telecommunications device, and said module manager being arranged to retrieve, check, and apply rules from the subscriber identity module and a subsequent application to the network access controller,
   wherein said network access controller is operable, as part of said network address translation, to modify outgoing data packets from the cellular mobile telecommunications device by replacing at least one IP address of an internal device within the cellular mobile telecommunications device with an IP address of the cellular mobile telecommunications device.

2. The cellular mobile telecommunications device as claimed in claim 1, further comprising a network gateway device.

3. The cellular mobile telecommunications device as claimed in claim 2, further comprising a router between a public network and an IP (Internet Protocol) local link.

4. The cellular mobile telecommunications device as claimed in claim 1, wherein the subscriber identity module comprises a Subscriber Identity Module (SIM).

5. The cellular mobile telecommunications device as claimed in claim 1, further comprising one of a mobile radio communications device and a home gateway.

6. The cellular mobile telecommunications device as defined in claim 1, wherein the control parameters comprise at least one of the network address translation, a filtering, and quality of service preferences.

7. The cellular mobile telecommunications device as claimed in claim 6, wherein said control parameters further comprise date and time duration information to be used in order to define when and how long the parameters apply.

8. The cellular mobile telecommunications device as claimed in claim 6, wherein said control parameters further comprise location information enabling the cellular mobile telecommunications device to apply settings depending on a location of the cellular mobile telecommunications device.

9. The cellular mobile telecommunications device as claimed in claim 6, wherein said control parameters further comprise a number of IPSec (Internet Protocol Security) sessions allowed.

10. The cellular mobile telecommunications device as claimed in claim 6, wherein said control parameters further comprise information on whether the cellular mobile telecommunications device be turned on or off.

11. The cellular mobile telecommunications device as claimed in claim 6, wherein said control parameters are grouped according to profiles for retrieval.

12. A telecommunications system comprising a network element and the cellular mobile telecommunications device, as defined in claim 1, and further including:
   a local IP (Internet Protocol) link; and
   at least one device connected via the local IP link.

13. A telecommunications system as claimed in claim 12, wherein the at least one device comprises an embedded device.

14. A telecommunications system as claimed in claim 13, wherein said embedded device comprises a hardware device.

15. A telecommunications system as claimed in claim 12, wherein the at least one device comprises an external terminal equipment.

16. A method of network access control based on control parameters in a cellular mobile telecommunications device of a telecommunications system, said method comprising:
   storing the control parameters in a subscriber identity module of the cellular mobile telecommunications device;
   allowing an access by a network access controller of the cellular mobile telecommunications device to the subscriber identity module for use of said control parameters to cause the cellular mobile telecommunications device to perform a router functionality including a network address translation; and
   retrieving, checking, and applying, by a module manager located between the network access controller and the subscriber identity module and located within the cellular mobile telecommunications device, rules from the subscriber identity module and a subsequent application to the network access controller,
   wherein said network access controller is operable, as part of said network address translation, to modify outgoing data packets from the cellular mobile telecommunications device by replacing at least one IP address of an internal device within the cellular mobile telecommunications device with an IP address of the cellular mobile telecommunications device.

17. The method as claimed in claim 16, wherein said control parameters are factory configured as pre-provisioning information, the method further including a remote access of the subscriber identity module for updating of the control parameters.

18. A method as claimed in claim 16, further including a remote access of the subscriber identity module for provisioning of the control parameters.

19. A method as claimed in claim 18, wherein said remote access is provided for pre-provisioning of the control parameters.

20. A method as claimed in claim 18, wherein said remote access allows for updating of the control parameters.

21. The cellular mobile telecommunications device as defined in claim 1, wherein the network access controller and the subscriber identity module are located within the cellular mobile telecommunications device.

\* \* \* \* \*